(12) United States Patent
Nijboer et al.

(10) Patent No.: US 8,599,668 B2
(45) Date of Patent: *Dec. 3, 2013

(54) METHOD FOR RECORDING DATA ON WRITE-ONCE STORAGE MEDIUM HAVING SPACE BIT MAP AND DEFECT MANAGEMENT STRUCTURES

(75) Inventors: Jakob Gerrit Nijboer, Geldrop (NL); Pope Ijtsma, Valkenswaard (NL)

(73) Assignee: Koninklijke Philips N.V., Eindhoven (NL)

( * ) Notice: Subject to any disclaimer, the term of this patent is extended or adjusted under 35 U.S.C. 154(b) by 44 days.

This patent is subject to a terminal disclaimer.

(21) Appl. No.: 12/434,194

(22) Filed: May 1, 2009

(65) Prior Publication Data

US 2009/0213701 A1    Aug. 27, 2009

Related U.S. Application Data

(62) Division of application No. 10/552,776, filed as application No. PCT/IB2004/050409 on Oct. 21, 2004.

(30) Foreign Application Priority Data

Apr. 14, 2003   (EP) .................................. 03076087

(51) Int. Cl.
*G11B 5/58*   (2006.01)
(52) U.S. Cl.
USPC .................. 369/53.24; 369/47.13; 369/53.15; 369/275.3

(58) Field of Classification Search
USPC .......... 369/53.17, 53.24, 59.25, 47.14, 30.07, 369/53.15, 47.13, 30.04; 714/710, 711
See application file for complete search history.

(56) References Cited

U.S. PATENT DOCUMENTS

| | | | |
|---|---|---|---|
| 5,802,028 A | 9/1998 | Igarashi | |
| 5,978,336 A | 11/1999 | Mine et al. | |
| 6,529,458 B1 * | 3/2003 | Shin | 369/53.17 |
| 6,594,209 B2 | 7/2003 | Ijtsma et al. | |
| 6,606,285 B1 | 8/2003 | Ijtsma et al. | |
| 6,804,797 B2 | 10/2004 | Ko et al. | |
| 6,922,802 B2 | 7/2005 | Kim et al. | |
| 7,414,938 B2 | 8/2008 | Kuraoka et al. | |
| 7,440,374 B2 | 10/2008 | Terada et al. | |
| 2001/0026518 A1 | 10/2001 | Shishido | |
| 2003/0068159 A1 | 4/2003 | De Haan | |
| 2003/0218951 A1 | 11/2003 | Suzuki et al. | |
| 2004/0165496 A1 | 8/2004 | Park et al. | |

(Continued)

FOREIGN PATENT DOCUMENTS

| | | |
|---|---|---|
| CN | 1701359 A | 11/2005 |
| EP | 0908882 A2 | 4/1999 |

(Continued)

*Primary Examiner* — Tan X Dinh

(57) ABSTRACT

A device for recording data and data structures on a write-once storage medium. The device has writing means for recording the data and the data structures and controlling means for generating the data structures and controlling the writing means. The data structures comprise space bit map and defect management structures. The controlling means are adapted to record the data structures at a predefined temporary location on the write-once storage medium and to finalize the write-once storage medium by recording the data structures at a predefined fixed location as defined for a rewritable storage medium.

7 Claims, 2 Drawing Sheets

(56) References Cited

U.S. PATENT DOCUMENTS

| | | |
|---|---|---|
| 2005/0207262 A1 | 9/2005 | Terada et al. |
| 2007/0122124 A1 | 5/2007 | Park et al. |
| 2008/0101180 A1* | 5/2008 | Lee et al. .................. 369/47.14 |

FOREIGN PATENT DOCUMENTS

| | | |
|---|---|---|
| EP | 1443517 A2 | 8/2004 |
| EP | 1505597 A1 | 2/2005 |
| EP | 1603131 A1 | 7/2005 |
| EP | 1612790 A1 | 4/2006 |
| JP | 2004280864 A | 10/2004 |
| JP | 2004280865 A | 10/2004 |
| JP | 2004280866 A | 10/2004 |
| JP | 2004288230 A | 10/2004 |
| JP | 2006514389 A | 4/2006 |
| JP | 2006518909 A | 8/2006 |
| JP | 2010073306 * | 4/2010 |
| WO | 0122416 A1 | 3/2001 |
| WO | 2004077412 A2 | 9/2004 |
| WO | 2004077415 A1 | 9/2004 |
| WO | 2004079731 A1 | 9/2004 |

* cited by examiner

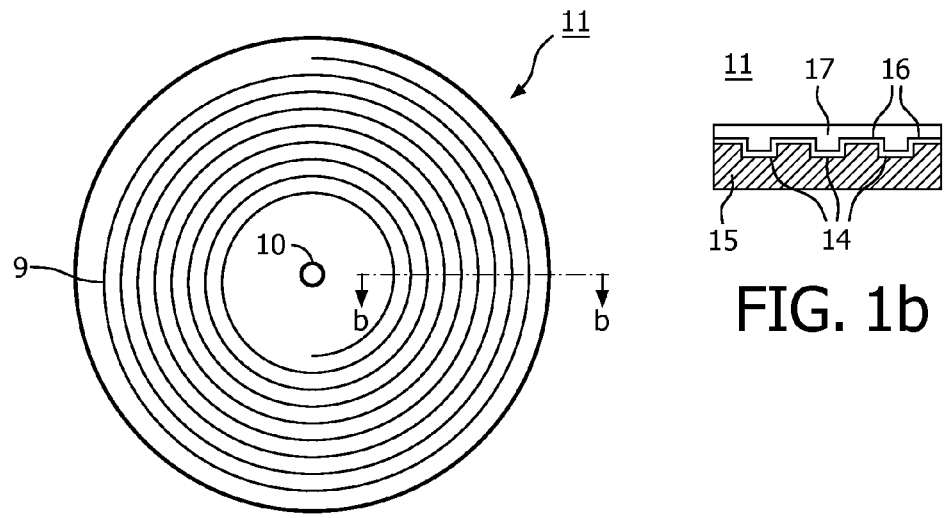
FIG. 1a
FIG. 1b
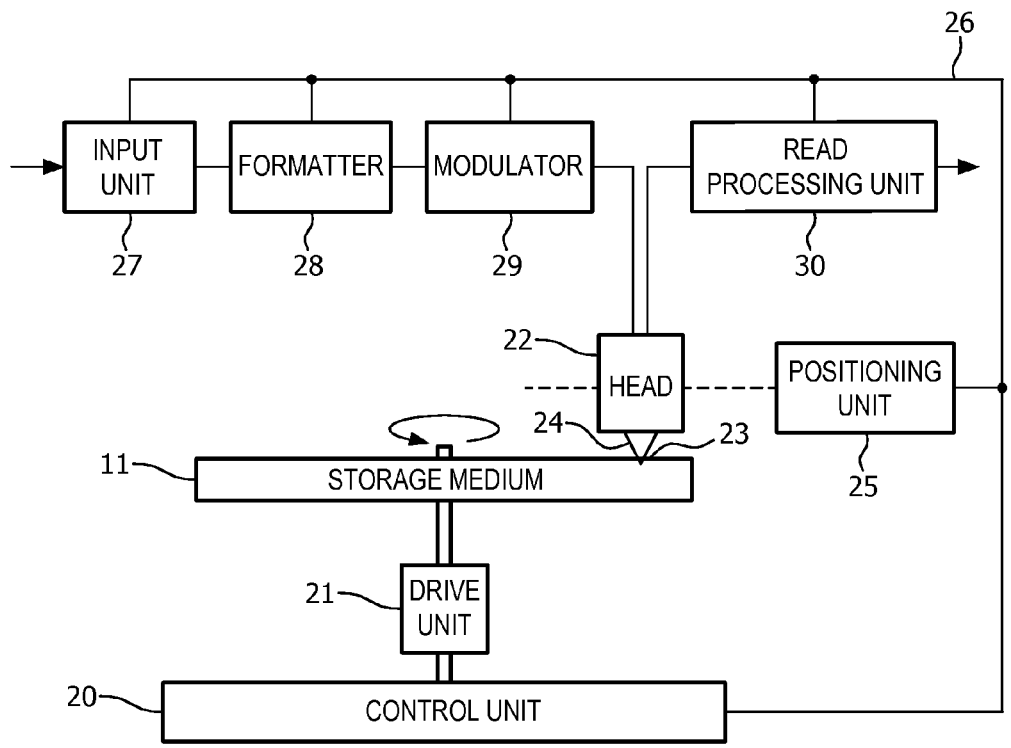
FIG. 2

METHOD FOR RECORDING DATA ON WRITE-ONCE STORAGE MEDIUM HAVING SPACE BIT MAP AND DEFECT MANAGEMENT STRUCTURES

This application claims the benefit or priority of and describes the relationships between the following applications: wherein this application is a division of U.S. patent application Ser. No. 10/552,776, filed Oct. 12, 2005, which is the National Stage of International Application No. PCT/IB2004/050409, filed Oct. 21, 2004, which claims the priority of foreign application EPO 03076087.0 filed Apr. 14, 2003.

This is a Divisional of application Ser. No. 10/552,776, filed Oct. 12, 2005 and is incorporated by reference herein.

The invention relates to a device for recording data and data structures on a write-once storage medium, the data structures comprising space bit map and defect management structures, the device comprising writing means for recording the data and the data structures;

controlling means for generating the data structures and controlling the writing means.

The invention further relates to a method of recording data and data structures on a write-once storage medium, the data structures comprising space bit map and defect management structures, the method comprising step of recording the data.

The invention also relates to a write-once storage medium for storing data and data structures, the data structures comprising space bit map and defect management structures.

The invention further relates to a computer program product for recording data and data structures on a write-once storage medium, the data structures comprising space bit map and defect management structures.

In some applications (archiving, legal) it is important that a recordable, write-once (WO) disc can be "finalized", where the effect of the finalization is that any further recording of the disc is not possible or that it can be easily detected or proven that more data has been added after the finalization process.

For CD-R and DVD±R this is achieved by recording a Lead-out Area, which area "closes" the User Data Zone. Although in some cases it might be possible to write additional information to the disc after the Lead-out Area, this can be easily detected.

Recordable Blu-ray Disc (BD-WO) in principle does not have such a Lead-out Area. As an alternative the disc could be completely filled with all dummy data, however this can be very time-consuming.

Therefore, it is an object of the invention to provide a simple, time-saving way of finalizing a write-once storage medium.

This object is achieved, according to a first aspect of the invention, by a device for recording data and data structures of the type described in the opening paragraph, characterized in that the controlling means are adapted to record the data structures at a predefined temporary location in a reserved area on the write-once storage medium and to finalize the write-once storage medium by recording the data structures at a predefined fixed location as defined for a rewritable storage medium.

According to a second aspect of the invention a method of recording data and data structures of the type described in the opening paragraph is provided, characterized by steps of:

recording the data structures at a predefined temporary location in a reserved area on the write-once storage medium;

finalizing the write-once storage medium by recording the data structures at a predefined fixed location as defined for a rewritable storage medium.

These and other aspects of the invention will be apparent from and elucidated further with reference to the embodiments described by way of example in the following description and with reference to the accompanying drawings, in which:

FIG. 1a shows a storage medium (top view),

FIG. 1b shows a storage medium (cross section),

FIG. 2 shows a device for recording information, in accordance with the invention.

Corresponding elements in different Figures have identical reference numerals.

Figure 3:
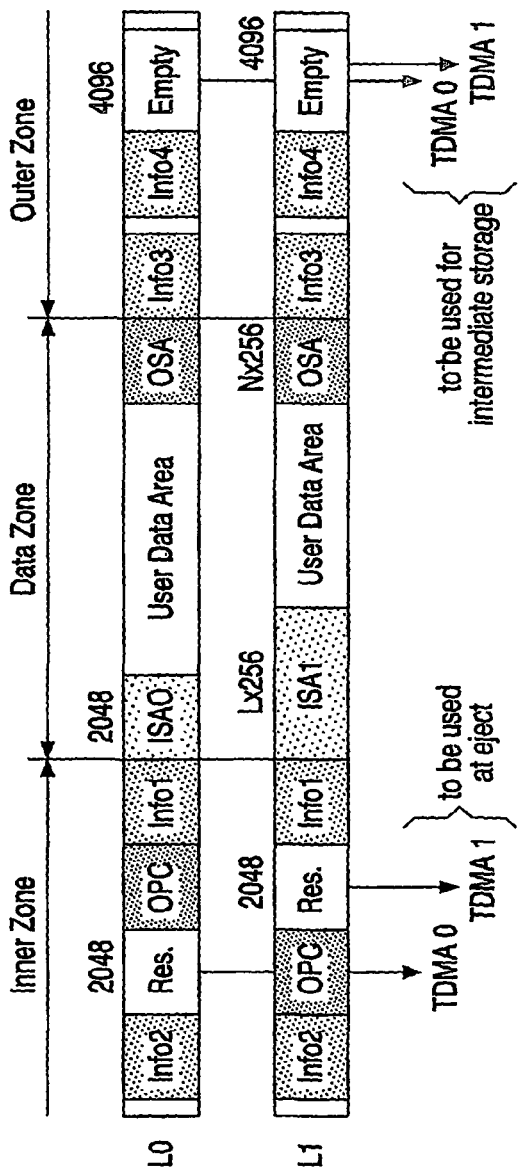
FIG. 3 shows an example of a layout of a BD-WO disc, in accordance with the invention.

FIG. 1a shows an example of a storage medium 11 having a form of disc with a track 9 and a central hole 10. The track 9, being the position of the series of (to be) recorded marks representing information (data), is arranged in accordance with a spiral pattern of turns constituting substantially parallel tracks on an information layer. The storage medium may be optically readable, called an optical disc, and has an information layer of a recordable type. Examples of a recordable disc are the CD-R, and writable versions of DVD, such as DVD±R, and the high density writable optical disc using blue lasers, called Blu-ray Disc (BD). The information (data) is represented on the information layer by recording optically detectable marks along the track. The track 9 on the recordable type of storage medium is indicated by a pre-embossed track structure provided during manufacture of the blank storage medium. The track structure is constituted, for example, by a pregroove 14, which enables a read/write head to follow the track during scanning. The track structure comprises position information, e.g. addresses, for indication the location of units of information, usually called information blocks.

FIG. 1b is a cross-section taken along the line b-b of the storage medium 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

FIG. 2 shows a device for recording data and data structures on a storage medium 11 such as CD-R, DVD±R or BD, in accordance with the invention. The device is provided with writing means for scanning the track on the storage medium, which means include a drive unit 21 for rotating the storage medium 11, a head 22, and a positioning unit 25 for coarsely positioning the head 22 in the radial direction on the track. The head 22 comprises an optical system of a known type for generating a radiation beam 24 guided through optical elements focused to a radiation spot 23 on a track of the information layer of the storage medium. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information (data) the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information (data). Hence retrieving means for reading information include the drive unit 21, the head 22, the positioning unit 25 and the read processing unit 30. The device comprises write processing means for processing the input information (data) to generate a write signal to drive the head 22, which means comprise an input unit 27, and modulator means comprising a formatter 28 and a modulator 29. The input information (data) may comprise for example real-time video and/or audio data or still images data. The input unit 27 processes the input data to unit of information, which are passed to the formatter 28 for adding control data and formatting the data, e.g. by adding error correction codes (ECC) and/or interleaving. For computer applications units of information may be interfaced to the formatter 28 directly—in such case, as an option, the input unit 27 does not have to be present in the device. The formatted data from the output of the formatter 28 is passed to the modulation unit 29, which comprises for example a channel coder, for generating a modulated signal, which drives the head 22. Further the modulation unit 29 comprises synchronizing means for including synchronizing patterns in the modulated signal. The formatted units presented to the input of the modulation unit 29 comprise address information and are written to corresponding addressable locations on the storage medium under the control of control unit 20. Further, the device comprises the control unit 20, which controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits.

It is noted that the device as shown in FIG. 2 has recording and reproducing functions. Alternatively a playback device for only retrieving information from a record carrier contains the scanning elements and the read processing circuitry, but does not have the input unit 27, the formatter 28 and the modulator 29.

For several reasons, BD-WO disc has a Space Bit Map (SBM). Such a SBM indicates which Error Correction Code (ECC) clusters have been recorded with information and which are still free. This SBM can be integrated with the Defect Management (DM) structures, which structures can be compatible with the same structures on a BD ReWritable (BD-RW) disc to make implementation easier. But they can also be recorded somewhere else e.g. in the lead-in area or lead-out area or user area. In the BD-RW specification some areas are reserved and could be used by BD-WO for this purpose, an example is a zone starting at Physical ADIP (ADress In Pre-groove) Address (PAA) 01DC00h with a length 2048 clusters.

The control unit 20 can be adapted to generate the SBM and DM structures and to control recording of those structures on a disc (a storage medium).

The SBM, generated by the control unit 20, can be implemented in the form of a bitmap in which each bit in a byte of the map indicates that an address (cluster) is written, for example if it is set to "1" and if the cluster is not written then the bit is zero.

The SBM can also include address pointers to indicate ranges of clusters that have been recorded (more efficient in case of sequential recording).

On a BD-RW disc the DM structures can be overwritten and thus can be updated after each recording action. The Defect Management Areas (DMAs), where these structures are recorded, therefore are rather small.

On a BD-WO disc overwriting is not possible, for which reason a Temporary Defect Management Area(s) (TDMA) can be reserved (this can be anywhere on the disc, e.g. in the Inner Zone as indicated in the FIG. 3). After each additional recording action, all new information for the DM structures and the SBM are written, under control of the control unit 20, in the next available ECC Cluster(s) of this TDMA. Because many separated recordings could be made, this TDMA should be as large as possible.

FIG. 3 shows schematically a possible layout of a BD-WO dual layer disc, according to the invention; the single layer disc is the same as the L0 layer in this picture. BD-WO has a User Data Zone, which comprises two replacement areas used for defect management, called ISA0 and OSA in the first layer and ISA1 and OSA in the second layer. The Inner and Outer Zone contain four defect management areas called INFO1, INFO2, INFO3 and INFO4; they are the same as the equivalent zones described in the BD-RW standard. In layer 0 and 1 there is an area of 2048 clusters that is reserved in the BD-RW standard; it can be used for TDMA (TDMA0, TDMA1) for a BD-WO disc. At the outside (Outer Zone) of the disc there is a reserved area in BD-RW that can be used in BD-WO as a intermediate DMA (IDMA) area (IDMA0, IDMA1). At the time of ejection of a disc from a device for recording information, DM structures and the SBM in IDMA can be copied, under control of the control unit 20, to TDMA. Locations of IDMA and TDMA can be interchanged, i.e. IDMA can be located in Inner Zone and TDMA in Outer Zone.

Both layers can have a OPC (Optimum Power Control) area used for detecting the correct write powers of a laser, under control of the control unit 20.

During the use of the BD-WO disc new clusters are written sequentially or randomly and the space bitmap (SBM) is updated, under control of the control unit 20, in the TDMA area (TDMA0 or TDMA1) several times. When the user decides to finalize the disc there maybe still unwritten area left on the disc. This invention shows how the disc can be closed in such a way that it is possible to check afterwards which clusters were recorded and which not at the moment of finalization.

At finalization the "normal" DMAs, i.e. as on a BD-RW disc, one copy in each of INFO1, INFO2, INFO3 and INFO4 (see FIG. 3) are recorded, under control of the control unit 20. These DMAs on a BD-WO disc shall contain the same kind of structures as on a BD-RW disc: a DDS (Disc Definition Structure) and a DFL (Defect List). These DMAs can be located at the same positions as on a BD-RW disc. When these "normal" DMAs have been recorded, it indicates always that the disc has been finalized.

The DDS shall contain now address pointers to the last valid structures in the TDMA just before the finalization, including the last valid SBM. The DDS can have also an address pointer to the last recorded address in the Data Zone in case the disc is sequentially recorded.

By doing so, filling of the remainder of the disc is not needed. If additional recordings have been made after finalization (so after recording of the "final" DDS in the DMAs in INFO1, INFO2, INFO3 and INFO4), this can be easily determined by inspecting, by the control unit 20, the specific SBM pointed to by the DDS. This bitmap in the SBM clearly shows which cluster has been recorded and which have not been recorded, inspection of the status of all the clusters (written or not), by the control unit 20, then show if more clusters have been added (written) after the finalization.

This procedure also works on randomly written BD-WO discs (usually write-once discs are recorded sequentially).

Another option is to fill all free TDMA area with dummy data at finalization under control of the control unit 20. Now it is impossible to record updates of the structures in the TDMA. The last DDS written in the TDMA area then has the contents of the last written space bitmap and the disc can be checked in the same way as explained above.

Yet another option for finalizing a BD-WO disc is to fill all remaining, i.e. not recorded, User Data Area with dummy data under control of the control unit 20.

Although the invention has been explained mainly by embodiments using the BD-WO disc, similar embodiments are suitable for finalizing the storage medium. Also for the storage medium an optical disc has been described, but other media, such as a magneto-optical disc or magnetic tape, can be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A device for recording data and data structures on a write-once storage medium, the device comprising:
    a recorder for recording the data and the data structures;
    a controller for generating the data structures and controlling the recorder, the data structures comprising space bit map and defect management structures including an address pointer to a last recorded address of a data zone of the write-once storage medium,
    wherein the controller is configured to control the recorder:
        to sequentially record the data zone of the write-once storage medium,
        to record the data structures on the write-once storage medium at a predefined temporary location in a reserved area as defined for a rewritable storage medium, and
        to finalize the write-once storage medium by recording the data structures including the address pointer to the last recorded address in the data zone at a predefined fixed location as defined for a rewritable storage medium.

2. The device as claimed in claim 1, wherein the controller is further configured to control the recorder to finalize the write-once storage medium by recording dummy data in all free parts of the reserved area.

3. The device as claimed in claim 1, wherein the controller is further configured to read the data structures from the predefined temporary location and to control the recorder to record the data structures at the predefined fixed location.

4. A method of recording data and data structures on a write-once storage medium, the method comprising acts of:
    recording the data;
    sequentially recording a data zone of the write-once storage medium;
    recording the data structures comprising space bit map and defect management structures including an address pointer to a last recorded address of the data zone on the write-once storage medium at a predefined temporary location in a reserved area as defined for a rewritable storage medium; and
    finalizing the write-once storage medium by recording the data structures including the address pointer to the last recorded address in the data zone at a predefined fixed location as defined for a rewritable storage medium.

5. The method as claimed in claim 4, further comprising an act of recording dummy data in all free parts of the reserved area.

6. The method as claimed in claim 4, further comprising an act of reading the data structures from the predefined temporary location.

7. A write-once storage medium comprising:
    data;
    a sequentially recorded data zone; and
    data structures recorded on the write-once storage medium at a predefined temporary location in a reserved area as defined for a rewritable storage medium, the data structures comprising space bit map and defect management structures including an address pointer to a last recorded address of the data zone of the write-once storage medium, and
    wherein the write-once storage medium is finalized by recording the data structures including the address pointer to the last recorded address in the data zone at a predefined fixed location as defined for a rewritable storage medium.

* * * * *